(12) United States Patent
Takahashi et al.

(10) Patent No.: US 8,309,251 B2
(45) Date of Patent: Nov. 13, 2012

(54) BATTERY WITH ELECTRODE ARRANGEMENT IN RELATION TO THE HOLDER

(75) Inventors: Atsushi Takahashi, Aichi (JP); Toshio Takeshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1024 days.

(21) Appl. No.: 11/866,697

(22) Filed: Oct. 3, 2007

(65) Prior Publication Data

US 2008/0280200 A1    Nov. 13, 2008

(30) Foreign Application Priority Data

Nov. 2, 2006    (JP) ................................ P2006-299425

(51) Int. Cl.
*H01M 2/02*    (2006.01)

(52) U.S. Cl. ............ 429/179; 429/96; 429/99; 429/100; 429/161; 429/211

(58) Field of Classification Search .................... 429/96, 429/99, 100, 176, 179, 161, 211
See application file for complete search history.

(56) References Cited

U.S. PATENT DOCUMENTS

| 6,767,667 | B1* | 7/2004 | Ooshima ........................ 429/162 |
| 2003/0064283 | A1 | 4/2003 | Uemoto et al. | |
| 2004/0029000 | A1* | 2/2004 | Morita et al. .................. 429/162 |
| 2004/0115527 | A1* | 6/2004 | Hiratsuka et al. ............. 429/176 |
| 2005/0112415 | A1 | 5/2005 | Takeshita et al. | |
| 2005/0164080 | A1 | 7/2005 | Kozu et al. | |
| 2006/0166089 | A1* | 7/2006 | Suzuki et al. ................. 429/185 |

FOREIGN PATENT DOCUMENTS

| EP | 1 473 785 A2 | 11/2004 |
| EP | 1 482 577 A1 | 12/2004 |
| JP | 8-17412 | 1/1996 |
| JP | 10-134786 | 5/1998 |
| JP | 11-155239 | 6/1999 |
| JP | 2000-251945 | 9/2000 |
| JP | 2001-196047 | 7/2001 |
| JP | 2001-273876 | 10/2001 |
| JP | 2003-77441 | 3/2003 |
| JP | 2003-234096 | 8/2003 |
| JP | 2003-242947 | 8/2003 |
| JP | 2003-308815 | 10/2003 |
| JP | 2005-142153 | 6/2005 |
| JP | 2005-190956 | 7/2005 |

OTHER PUBLICATIONS

U.S. Appl. No. 12/845,443, filed Jul. 28, 2010, Takeshita, et al.
U.S. Appl. No. 12/845,437, filed Jul. 28, 2010, Takeshita, et al.

* cited by examiner

*Primary Examiner* — Mark F Huff
*Assistant Examiner* — Frank Chernow
(74) *Attorney, Agent, or Firm* — Oblon, Spivak, McClelland, Maier & Neustadt, L.L.P.

(57) ABSTRACT

A battery includes a battery cell and a battery housing. The battery cell includes arcuate portions wherein an outer circumference of the battery cell is formed at least in part to be arcuate. The battery housing includes angular portions respectively opposing the arcuate portions and for storing the battery cell therein. Support walls having substantially the same curvatures as the arcuate portions and supporting the arcuate portions are formed along an insertion direction of the battery cell.

7 Claims, 13 Drawing Sheets

FIG.12A   FIG.12B   FIG.12C
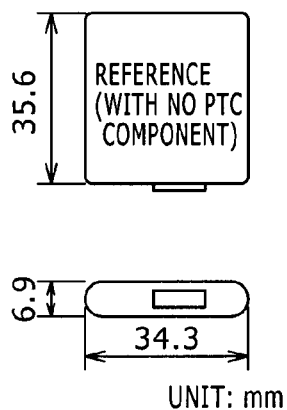
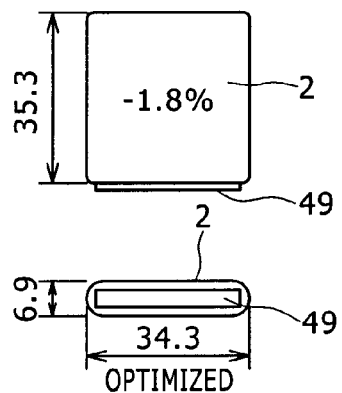
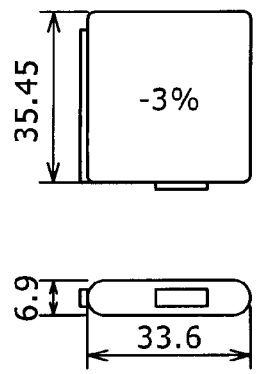
FIG.12D   FIG.12E
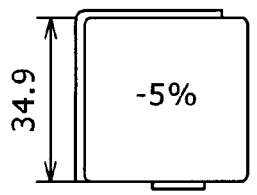
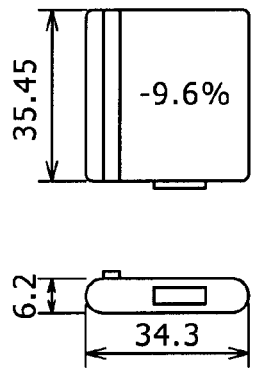

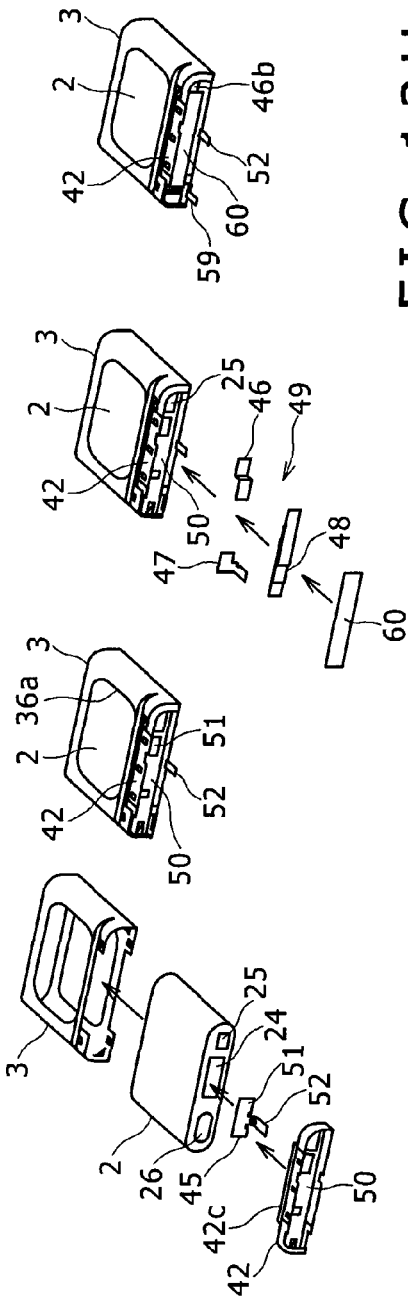
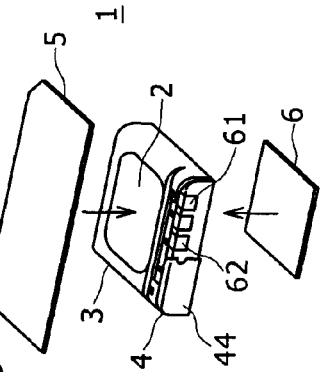
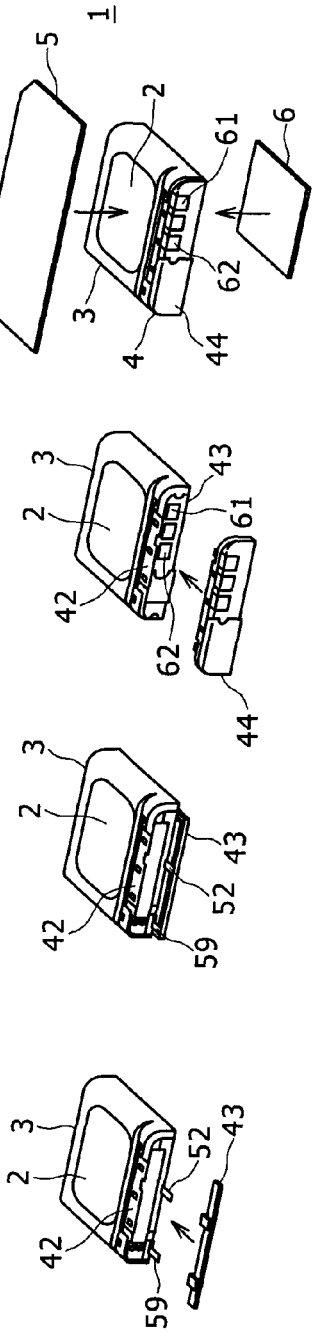

BATTERY WITH ELECTRODE ARRANGEMENT IN RELATION TO THE HOLDER

CROSS REFERENCES TO RELATED APPLICATIONS

The present invention contains subject matter related to Japanese Patent Application JP 2006-299425 filed in the Japanese Patent Office on Nov. 2, 2006, the entire contents of which being incorporated herein by reference.

BACKGROUND OF THE INVENTION

1. Field of the Invention

The present invention relates to a battery, such as a lithium ion or lithium polymer battery, in which a battery element working as a power generation element is stored in a housing, and power generated by the battery element is output from a pair of positive and negative terminals.

2. Description of the Related Art

In recent years, the demand for information devices, such as notebook personal computers, mobile communication devices such as cellular phones, portable electronic devices such as video cameras, digital still cameras, and portable audio devices has been rapidly increased. As power sources for such electronic devices, small closed-type secondary batteries, such as nickel cadmium batteries, nickel hydrogen batteries, and lithium ion batteries, are employed in various fields by virtue of their characteristics, such as high voltage, high energy density, and lightweight.

In particular, polymer lithium ion secondary batteries are used as batteries taking measures to prevent liquid leakage that poses problems when a liquid electrolyte is used. Such batteries include a type using a gel-like polymer membrane formed by impregnating a nonaqueous electrolyte into a polymer, and a type using a totally solid state electrolyte.

Polymer lithium ion secondary batteries of the above-described type have battery characteristics, such as high energy density, and lightweight. For these batteries, further technological development is being progressed to satisfy needs in recent years for, for example, miniaturization, lightweight, thinning of various electronic devices by taking advantage the above-described characteristics as well as characteristics in terms of a high degree of freedom in battery shape.

Among polymer lithium ion secondary batteries, one type being popularly used is manufactured in the following manner. A battery cell including a laminate-structured battery element is formed; and the battery cell is connected to a circuit board including components, such as electrode terminals, and then is stored with the electrolyte into a metallic container. Among lithium-ion secondary battery, one type being popularly used is manufactured in the following manner. A battery cell is formed and stored with the electrolyte in a metallic container, and a printed circuit board including positive and negative terminal portions is coupled to positive and negative electrodes formed on an end face of the battery cell; and an assembly thus formed is stored into a plastic housing or the like. In this case, the battery cell further includes a protection device such as a PTC component (PTC: positive temperature coefficient) that is used for charge control, safety control, and the like by detecting the temperature and shuts down and controls an input/output circuit.

For such lithium ion secondary batteries, the demand about, for example, miniaturization of the whole battery and increasing of the battery capacity is increased in association with the progress in functional enhancement and miniaturization of portable electronic devices. The miniaturization of the whole battery is relatively easily accomplishable by miniaturization of, for example, the battery and the battery housing. On the other hand, however, a desired battery capacity cannot be obtained when the battery element is miniaturized. In contrast, in the case where the battery element and the battery cell that encloses the battery element are, respectively, large, while the capacity can be increased, the whole battery has to be enlarged. However, in the case where the capacity of the battery cell is increased while preventing enlargement of the whole battery, the battery housing has to be thinned, such that a sufficient mechanical strength of the battery cannot be obtained. This can potentially leads to undesired incidents, such as deformation and damaging, caused by, for example, a fall accident and an environmental change, such as a temperature change under compression forces being exerted by an urging member provided on the side of the electronic device.

REFERENCES

Patent Publication 1 (Japanese Unexamined Patent Application Publication No. 2003-77441

Patent Publication 2 (Japanese Unexamined Patent Application Publication No. 2005-142153

It would be desirable to provide a battery that is capable of increasing a battery capacity by increasing a battery cell volume and that is capable of securing the strength of a battery housing.

SUMMARY OF THE INVENTION

According to one embodiment of the present invention, a battery includes a battery cell including arcuate portions wherein an outer circumference of the battery cell are formed at least in part to be arcuate; a battery housing including angular portions respectively opposing the arcuate portions and for storing the battery cell therein, wherein support walls respectively having substantially the same curvatures as the arcuate portions and supporting the arcuate portions are formed along an insertion direction of the battery cell.

According to the battery, the support walls are respectively formed in the angular portions along the insertion direction of the battery cell, so that resistance against compression forces exerted along the insertion direction of the battery cell is improved. As such, even in the case the major side portions of the battery housing are formed to be thin to increase the volume of the battery cell, the strength of the battery housing is not reduced. Consequently, according to the battery, even when compression forces generated by, for example, a battery-ejection urging member are imposed in the event of insertion and storage into a battery storage portion of an electronic device, external dimensions can be maintained.

BRIEF DESCRIPTION OF THE DRAWINGS

Embodiment(s) of the present invention will be described in detail based on the following figures, wherein:

—FIG. 2A is a perspective view of the camera, FIG. 2B is a rear perspective view of the camera, and FIG. 2C is a perspective view of a sidewall with a battery cover attached thereto;

—FIG. 8A is a plan perspective view of the positive electrode tab, and FIG. 8B is a bottom perspective view of the positive electrode tab;

FIGS. 12A to 12E, respectively, are explanatory views showing the relationships between adhered portions of a PTC component and the volumes of the battery cell;

FIGS. 13A to 13H, respectively, views showing assembling steps of the secondary battery;

DETAILED DESCRIPTION OF THE PREFERRED EMBODIMENT

With reference to the accompanying drawings, a battery according to the present invention will be described in detail by way of an embodiment of a lithium ion secondary battery.

Figure 1:
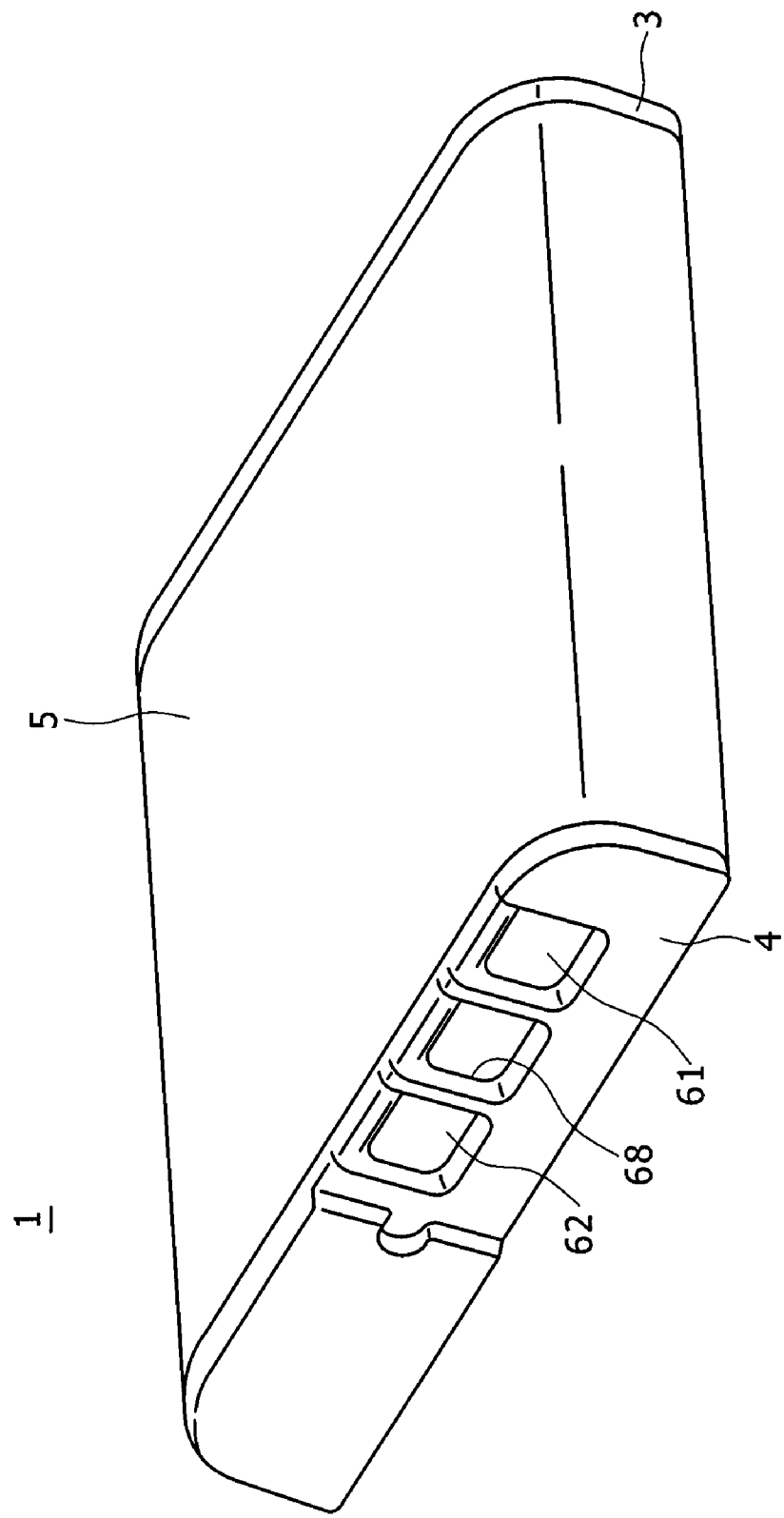
FIG. 1 is a perspective view of a secondary battery according to an embodiment of the present invention.
Figure 2A:
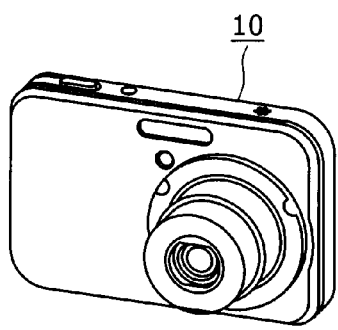
FIGS. 2A to 2C, respectively, are views of a digital still camera using the secondary battery of the embodiment
Figure 2B:
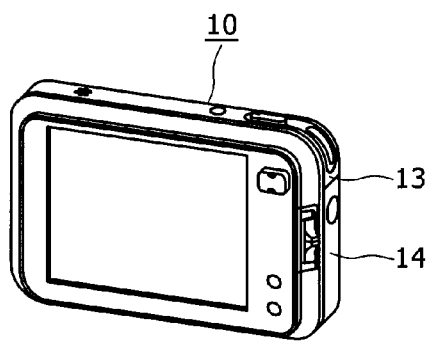
Figure 2C:
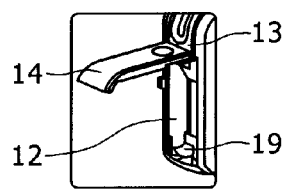
Figure 3:
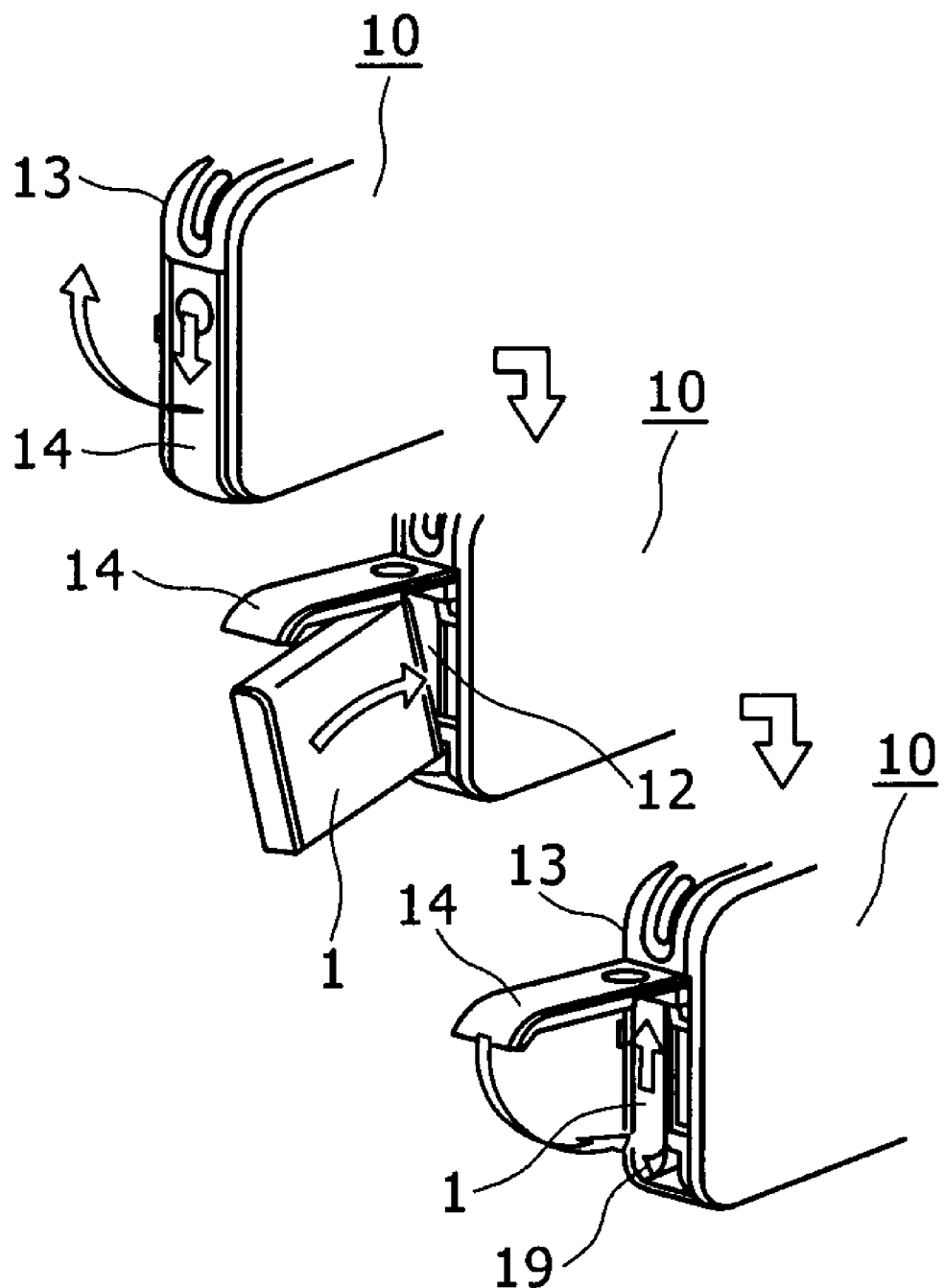
FIG. 3 is a perspective view of the digital still camera into which the secondary battery is stored.

FIG. 1 shows a secondary battery 1 represented by, for example, a lithium ion secondary battery that has a substantially rectangular parallelopiped shape. The secondary battery 1 is usable in a variety of electronic devices, and FIGS. 2A to 2C shows an example case where the secondary battery 1 is used in a digital still camera 10.

More specifically, the secondary battery 1 is accommodated in a battery storage portion 12 provided in the interior of a body of the digital still camera 10, whereby, drive power is supplied to the digital still camera 10. With reference to the battery storage portion 12 is formed from a substantially flat recess portion corresponding to the shape of the secondary battery 1. A battery cover 14 pivotably provided in a sidewall portion 13 of the digital still camera 10 is opened, whereby the battery storage portion 12 is caused to face outward. After the secondary battery 1 has been stored in the battery storage portion 12, the battery storage portion 12 is closed by the battery cover 14.

The battery storage portion 12 includes, on a bottom portion of its own, storage portion electrodes (not shown) for contact with respective positive and negative terminal portions 61 and 62. The secondary battery 1 (described further below) is held so that a front face thereof having the positive and negative terminal portions 61 and 62 can be used as an insertion end, and then is stored into the battery storage portion 12. Thereby, the secondary battery 1 is coupled to the storage portion electrodes to be ready to supply power to the digital still camera 10.

The battery storage portion 12 includes an urging member (not shown) and an anchoring member 19. The urging member operates to eject the secondary battery 1 from the battery storage portion 12. In opposition to urging forces of the urging member, the anchoring member 19 anchors the secondary battery 1 into the battery storage portion 12. The anchoring member 19 is slidable, and is slid when ejecting the secondary battery 1 from the battery storage portion 12. Thereby, the anchored state of the secondary battery 1 is cancelled, and the secondary battery 1 becomes ejectable.

The battery storage portion 12 and the secondary battery 1 are formed in accordance with the same specifications as applied to other electronic devices, such as digital still cameras and cam coders, excepting the digital still camera 10. The respective electronic device enters a readily drivable state when the secondary battery 1 is stored in the respective electronic device including the normalized battery storage portion 12. This enables the respective electronic device to be used in various manner such as in a case where an electronic device is used by replacing a secondary battery accompanying the electronic device with an optional secondary battery and in a case where the secondary battery 1 is shared among a plurality of the electronic devices.

Then, the secondary battery 1 will be described in more detail herebelow. With reference to FIGS. 1 to 4, the secondary battery 1 is formed in the following manner. A metallic battery cell 2 containing electrode elements is inserted from an opening portion provided to the front side of a substantially flat resin battery housing 3. The opening portion is closed by a battery cover 4 including positive and negative terminal portions coupled, respectively, to positive and negative portions of the battery cell 2. Then, the secondary battery 1 is wounded by an exterior film 5 and a model ID film 6.

Figure 5:
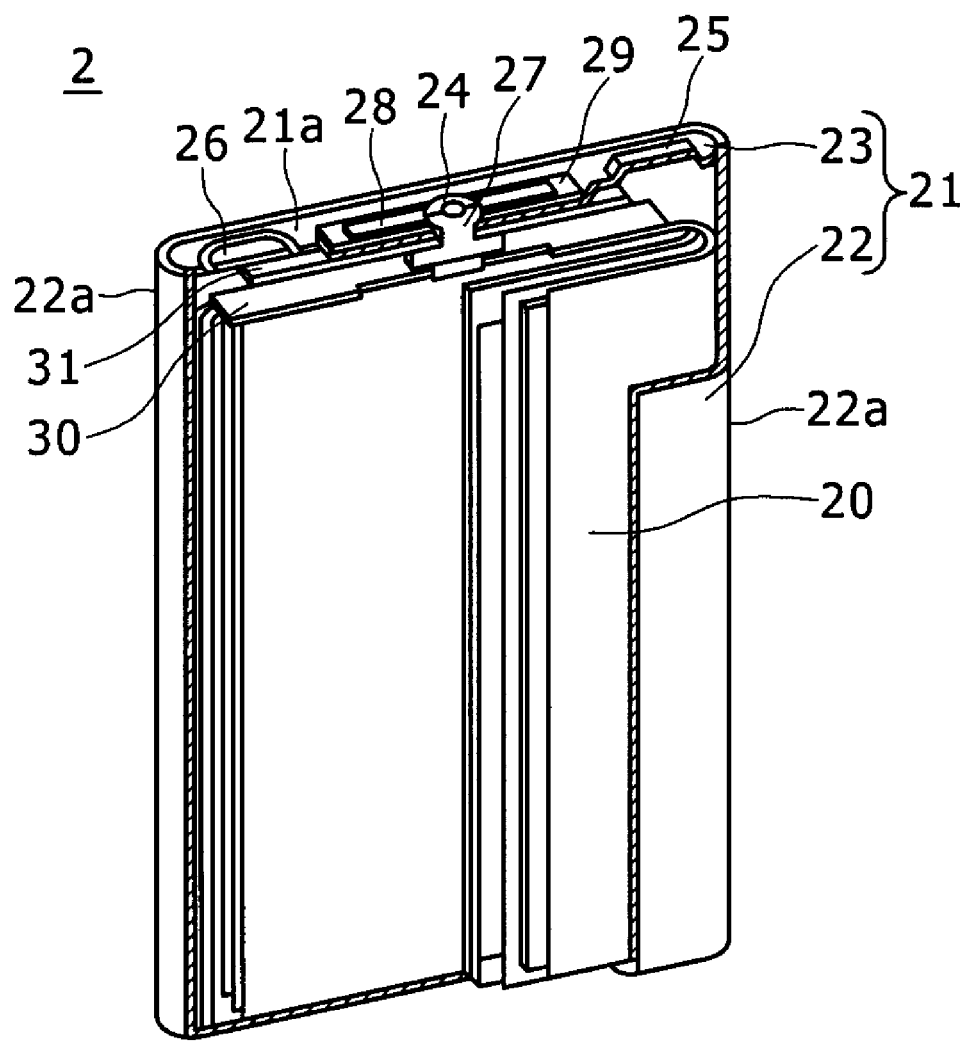
FIG. 5 is a partial perspective view of an interior of the battery.

With reference to FIG. 5, the battery cell 2 is formed in the manner that a battery element 20 is sealed in a nonaqueous electrolyte into a metallic cell container 21. The battery element 20 is formed such that strip-shaped positive and negative electrodes are laminated together via a separator and are wounded in the longitudinal direction. The cell container 21 includes a metallic container 22 having substantially a rectangular planar shape with an elliptic cross section, and an elliptic cap 23 that constitutes a front face 21a of the cell container 21 while closing the metallic container 22. On the front face 21a of the cell container 21, there are formed positive and negative portions 24 and 25 and a safety valve 26.

The positive electrode is formed from a positive electrode active material layer formed on a strip-shaped positive current collector. Similarly, the negative electrode is formed from a negative electrode active material layer formed on a strip-shaped negative current collector.

A positive lead is led out from the positive electrode, and is coupled to a positive electrode pin 27 attached to the cap 23. Thereby, in the cell container 21, the positive electrode portion 24 is formed in substantially the center of the front face 21a. Similarly, a negative electrode lead is led out from the negative electrode, and the negative electrode lead is coupled to a part of the metallic container 22. Thereby, in the negative portion 25, the negative polarity is formed on the whole cell container 21 including the negative electrode portion 25 but excepting the positive portion 24 of the front face 21a.

Correspondingly to the type of a battery to be configured, the positive electrode can be formed using a metal oxide, metal sulfide, or specific polymer as a positive electrode active material. For example, for configuring a lithium ion battery, a lithium composite oxide containing $Li_xMO_2$ as a main component can be used as a positive electrode active material (In the formula $Li_xMO_2$, M denotes one or more transition metals, and x is variable depending upon the charge/discharge state of the battery—which ordinarily takes a value within the range of from 0.05 or more to 1.10 or less). As a transition metal M constituting the lithium composite oxide, at least one of Co, Ni, Mn, and the like is preferable. Examples of such lithium composite oxides are, but not limited to, $LiCoO_2$, $LiNiO_2$, $LiNi_yCO_{1-y}O_2$ (where, $0<y<1$), and $LiMn_2O_4$. Any one of those lithium composite oxides is capable of generating high voltages and is further capable of acting as a positive electrode active material excellent in energy density.

Alternatively, for the positive electrode active material, either any one of metal sulfides or oxides, such as $TiS_2$, $MoS_2$, $NbSe_2$, and $V_2O_5$, which do not contain lithium. Still alternatively, for the positive electrode, a plurality of the positive electrode active materials such as described above can be used in combination. When forming the positive electrode by using the positive electrode active materials, a known conductor, binder, and the like can be added.

The negative electrode material may be a material permitting lithium doping or dedoping. For example, the material may be a non-graphitic carbon or graphitic carbon material. More specifically, the material may be any one of, for example, pyrocarbons, cokes (such as pitch, needle, petroleum cokes), graphites, glassy carbons, organic polymer compound calcined materials (such as those formed in the manner that phenolic and furan resins are calcined at appropriate temperatures and are carbonated thereby), carbon fibers, and activated carbons. Further, the material permitting lithium doping or dedoping may be any one of, for example, polymers such as polyacetylene polypyrrole, and oxides such as $SnO_2$. For forming the negative electrode from any of the materials such as described above, a known binder and the like can be added.

The separator isolates between the positive and negative electrodes, thereby to prevent current shortcircuiting resulting from contacts between the two electrodes and to permit lithium ions in the nonaqueous electrolyte to transmit. The separator is a microporous resin layer or film having a large number of pores, of which an average size is about 5 µm or less. Example resins are, but not limited to, an olefinic polymer, polyethylene polymer, cellulose polymer, polyimide, nylon, glass fiber, and alumina fiber.

The nonaqueous electrolyte is prepared by appropriately blending an organic solvent and an electrolytic salt.

The organic solvent is not specifically limited, but may be any of those used with ordinary nonaqueous electrolyte batteries. For example, usable organic solvents include propylene carbonate, ethylene carbonate, vinylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl, 1,3-dioxolane, diethyl ether, sulfolane, methyl sulfolane, acetonitrile, propionitrile, anisole, acetic acid ester, butyric acid ester, propionic acid ester.

The electrolytic salt is not specifically limited, but may be any of those used with ordinary nonaqueous electrolyte batteries. For example, any one or a mixture of two or more of, for example, $LiClO_4$, $LiAsF_6$, $LiPF_6$, $LiBF_4$, $LiB(C_6H_5)_4$, $LiCH_3SO_3$, $LiCF_3SO_3$, LiCl, and LiBr.

With reference to FIG. 5, the cell container 21, which contains the battery element 20, includes the metallic container 22 that stores the battery element 20, and the cap 23 that closes the metallic container 22 and that constitutes the front face 21a of the cell container 21.

The metallic container 22 has a substantially flat rectangular parallelopiped shape with one open side and with arcuate portions 22a on edges on narrow sides, whereby the metallic container 22 has a cross section formed into substantially an elliptical shape. The metallic container 22 is formed by deep drawing of a metal material, such as aluminium or iron material, thereby being formed into the substantially flat rectangular parallelopiped shape, in which an opening portion for insertion of the battery element 20 is formed only on the front face. In the state where the battery element 20 is stored, the cell container 21 exhibits a sufficient mechanical strength against shocks resulted from, for example, an accidental drop, vibrations, and possible damage by sharp edges of, for example, sharp blades. Further, the cell container 21 is capable of preventing the battery element 20 from being exposed on the outside even when, for example, the exterior film 5 and the model ID film 6 (which are described further below) are accidentally peeled off or cut.

The cap 23 is welded to the front side of the metallic container 22, thereby to close the metallic container 22 and to constituting of the positive and negative portions 24 and 25 of the battery element 20. The cap 23 is an elliptical planar shape meeting the cross sectional shape of the metallic container 22. The positive portion 24 is formed in substantially a central portion of the cap 23, the negative portion 25 is formed on longitudinal one end thereof, and the safety valve 26 is formed on the longitudinal other end thereof.

The positive electrode portion 24 includes the positive electrode pin 27, a positive terminal plate 28, and an insulating plate 29. The insulating plate 29 is provided on the cap 23 for the reason that it constitutes the metallic container 22 including the cap 23, thereby to insulate the positive electrode portion 24 from other negative electrode portions. The positive terminal plate 28 is disposed on the insulating plate 29 and is coupled to a positive electrode tab 45 of the battery cover 4. The positive electrode pin 27 is electrically connected to the positive electrode lead led out from the positive electrode of the battery element 20. The positive electrode portion 24 is formed in substantially a central portion of the cap 23 in the manner that the insulating plate 29 and the positive terminal plate 28 are overlapped together and led out through the positive electrode pin 27.

The negative portion 25 is a portion in which a first negative electrode tab 46 (described further below) of the battery cover 4 is coupled, and is press formed relatively higher. The safety valve 26 opens in response to the event that the temperature is increased by, for example, overcharging or shortcircuiting of the secondary battery 1 to the extent of increasing the pressure in the cell container 21 up to a preset pressure, thereby to prevent explosion of the cell container 21. The safety valve 26 is attached in the manner that a metal sheet of, for example, stainless steel, nickel plated steel, or aluminium is attached by laser welding or the like manner to a valve opening formed on the other side of the cap 23.

The cell container 21 has a gasket 31 that holds a partition plate 30 and the positive electrode pin 27 on the positive portion 24. The partition plate 30 is formed of polypropylene to maintain insulation between the battery element 20 and the cap 23.

The whole battery cell 2, excepting the positive electrode portion 24 of the cell container 21, constitutes the negative electrode, so that, even when the exterior film 5 and the model ID film 6 (which are described further below) are, for example, torn to the extent of exposing a part of the cell container 21 to the outside, safety is secured.

The battery housing 3 for storing the battery cell 2 will now be described in more detail herebelow.

Figure 4:
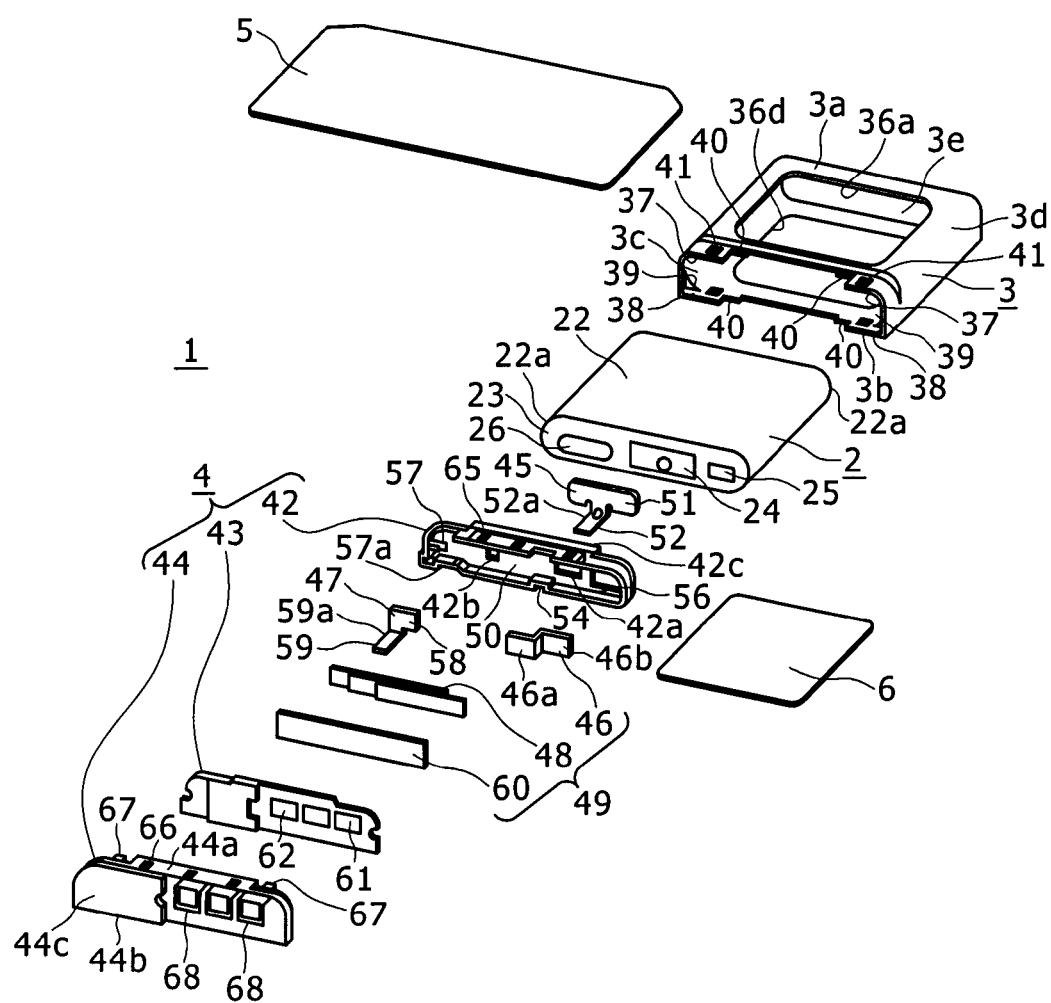
FIG. 4 is an exploded perspective view of the secondary battery (according to the embodiment)

With reference to FIG. 4, the battery housing 3 is a plastic housing having a substantially flat rectangular parallelopiped shape having one open side and a substantially trapezoidal cross section, wherein one edge on a narrow side is arcuate and the other edge is angular. The battery housing 3 is injection moded into the substantially flat rectangular parallelopiped shape, and the front side thereof is open. The battery cell 2 is inserted into the battery housing 3 from the front side, and battery cover 4 is attached to the battery housing 3.

Figure 6A:
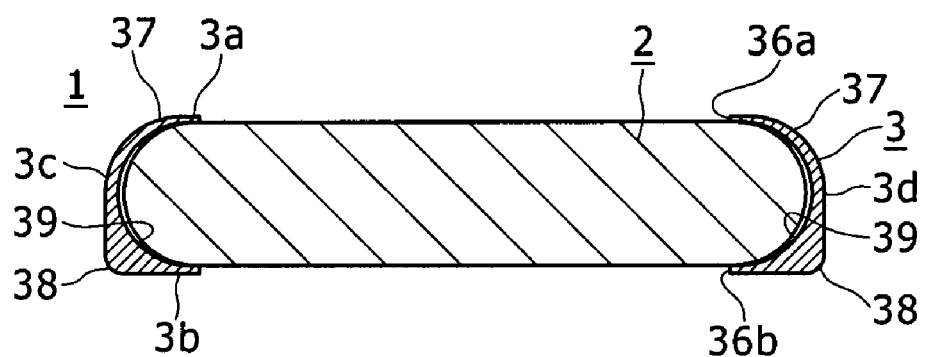
FIGS. 6A and 6B, respectively, are cross sectional views of the secondary battery with a battery cell expanded.
Figure 6B:
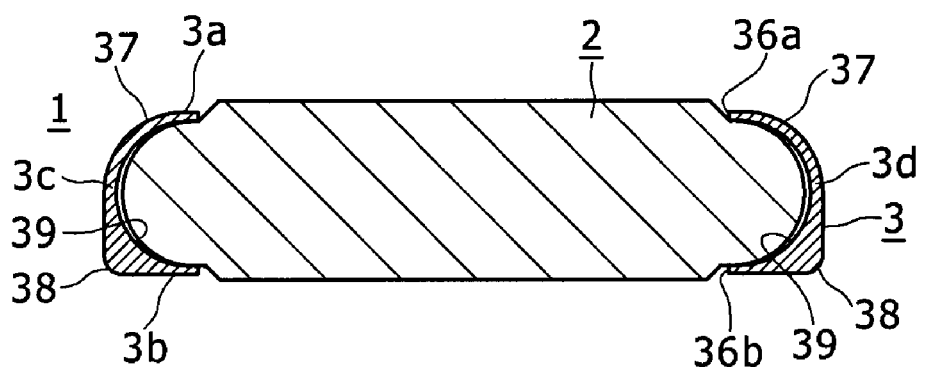

The battery housing 3 has main and reverse (opposite) wall portions 3a and 3b, and opening portions 36a and 36b are, respectively, formed to the major and reverse side 3a and 3b. The opening portions 36a and 36b, respectively, expose major surfaces of the battery cell 2 stored in the battery housing 3 to the outside. The battery cell 2 can expand as the battery cell 2 is repeatedly overheated and charged/discharged. In such a case, a storage margin can be imparted by the opening portions 36a and 36b to the battery housing 3 into which storing the battery cell 2 is stored in a delivery time (see FIG. 6A). The opening portions 36a and 36b, respectively, are formed internally of outer edges of the main and reverse wall portions 3a and 3b of the battery housing 3 into rectangular shapes along the outer edges. As such, the cross sections of respective two sidewall portions 3c and 3d as viewed along the direction perpendicular to the insertion direction of the battery cell 2, and the cross section of a back wall portion 3e as viewed along the insertion direction of the battery cell 2 have substantially U shapes.

In the sidewall portions 3c and 3d of the battery housing 3, respective arcuate portions 37 are formed on an edge on the side of the main wall portion 3a, and respective angular portions 38 are formed on an edge of the side of the reverse wall portion 3b. The arcuate portion 37 on the side of the main wall portion 3a is formed with substantially the same curvature as the arcuate portion 22a of the metallic container 22, and supports the arcuate portion 22a without providing a clearance. In the angular portion 38 on the side of the reverse wall portion 3b, a respective support wall 39 having substantially the same curvature as the arcuate portions 22a is formed in a clearance area opposing the arcuate portions 22a of the metallic container 22. Thus, in the battery housing 3, the arcuate portions 22a of the battery cell 2, respectively, oppose the angular portions 38. If no measures are taken for the battery housing 3, a clearance would be formed between the angular portion 38 and the arcuate portion 22a. However, in the battery housing 3, the support walls 39 for supporting the arcuate portions 22a are formed in such supposed clearance portions to be arcuate continuously from the sidewall portions 3c and 3d to the reverse wall portion 3b. Thereby, in the battery housing 3, even on the edge on the side of the reverse wall portion 3b, the arcuate portions 22a of the battery cell 2 are supported by the support walls 39 with no clearances being provided. Consequently, the battery cell 2 can be stored without being loosened through the arcuate portions 37 and the support walls 39.

In the battery housing 3, with the support walls 39 thus formed, the edge on the side of the battery housing 3 can be formed with a large wall thickness along the insertion direction of the battery cell 2, resistance against compression forces along the insertion direction of the battery cell 2 can be improved. Consequently, in the case that the secondary battery 1 is stored into the battery storage portion 12 of the digital still camera 10, and the battery storage portion 12 is closed by the battery cover 14, even when compression forces are exerted along the insertion direction of the battery cell 2 by the urging member that urges the positive and negative terminal portions 61 and 62 onto the storage portion electrodes, the battery housing 3 does not cause buckling or the like.

The battery housing 3 has protrusions 40 in side edge portions on the respective front face sides of the major and reverse sides 3a and 3b. The protrusions 40 are brought into contact from the outside in conjunction with a holder 42 of the battery cover 4. When the protrusions 40 are brought into contact in conjunction with the holder 42 from the outside, deflection of the major and reverse sides 3a and 3b is prevented, thereby enable improving the resistance against loads exerted from the sides of the sidewall portions 3c and 3d can be improved. Further, in portions adjacent the protrusions 40 in side edge portions on the front wall sides of the main and reverse wall portions 3a and 3b, the battery housing 3 has a plurality of engagement protrusion portions 41 with which engagement protrusion portions 67 are engaged. The engagement protrusion portions 67 are provided to a top cover 44 of the battery cover 4. The engagement protrusion portions 41 and the engagement protrusion portions 67 of the top cover 44 are engaged with one another, whereby the battery cover 4 are attached to the battery housing 3.

The battery cover 4, which is thus attached to the battery housing 3, has electrode terminal portions for coupling with the positive and negative portions 24 and 25. The battery cover 4 closes the battery housing 3 storing the battery cell 2 and exposes the terminal portions to the outside. With reference to FIG. 4, the battery cover 4 includes the holder 42 attached to the front wall of the battery housing 3, a terminal plate 43 supported by the holder 42, and the top cover 44 for covering the front wall of the battery housing 3 to which the holder 42 and the terminal plate 43 are attached.

The holder 42 holds the positive electrode tab 45, an electrode protection member 49, and the terminal plate 43 to the front wall portion of the battery housing 3. The positive electrode tab 45 is provided to the front wall of the battery housing 3 and is coupled to the positive portion 24 and to a positive electrode weld plate 63 of the terminal plate 43. The electrode protection member 49 has first and second negative electrode tabs 46 and 47 coupled to the negative electrode portion 25 and to a negative electrode weld plate 64 of the terminal plate 43, and a temperature sensitive device(s) such as a PTC component(s) 48 (PTC: positive temperature coefficient). The holder 42 is a substantially trapezoidal planar component molded from a synthetic resin into substantially the same shape as the cross sectional shape of the battery housing 3, in which an edge on the narrow side is arcuate. Further, the holder 42 has a recess portion on its front wall. More specifically, the holder 42 has a holding portion 50 that includes a rectangular recess portion open in the same direction as an opening direction of the front wall of the battery housing 3, thereby to store the electrode protection member 49 and to support the terminal plate 43.

Figure 7:
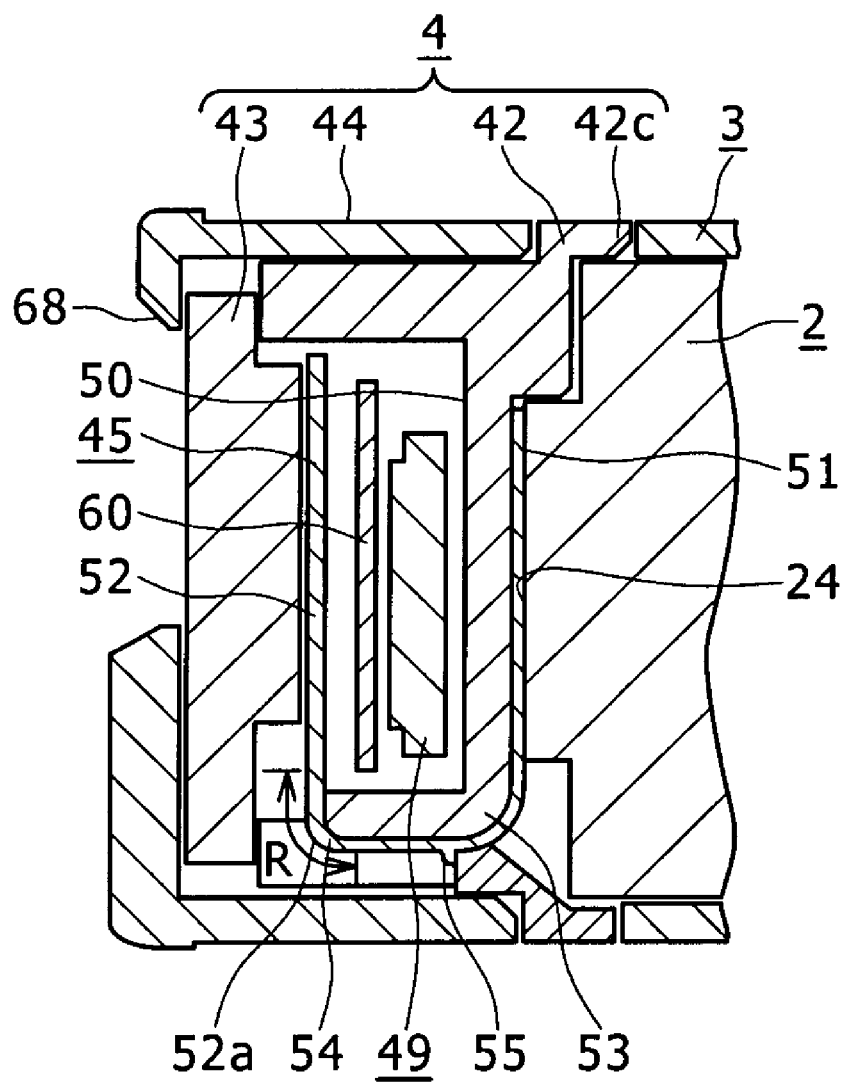
FIG. 7 is a cross sectional view of the secondary battery with the battery cover attached thereto.

The holder 42 further includes a rectangular recess portion corresponding to the shape of the positive electrode tab 45 on a face opposite to the holding portion 50, more specifically in substantially a longitudinal central portion of a face opposite to the battery cell 2. The rectangular recess portion includes a welding opening portion 42a for welding the positive electrode tab 45 from the side of the holding portion 50 to the positive electrode portion 24 of the battery cell 2. Further, as shown in FIG. 7, the holder 42 has an insertion opening 53 on a lower surface side in a substantially central portion in the longitudinal direction. The insertion opening 53 is used to insert and hold the positive electrode tab 45, and is continually formed from the rectangular recess portion. The insertion opening 53 is formed on a reverse face opposite to the positive portion 24 of the battery cell 2, in which the positive electrode tab 45 is inserted from the side of the reverse face and is drawn out from the lower surface of the holder 42.

Figure 8A:
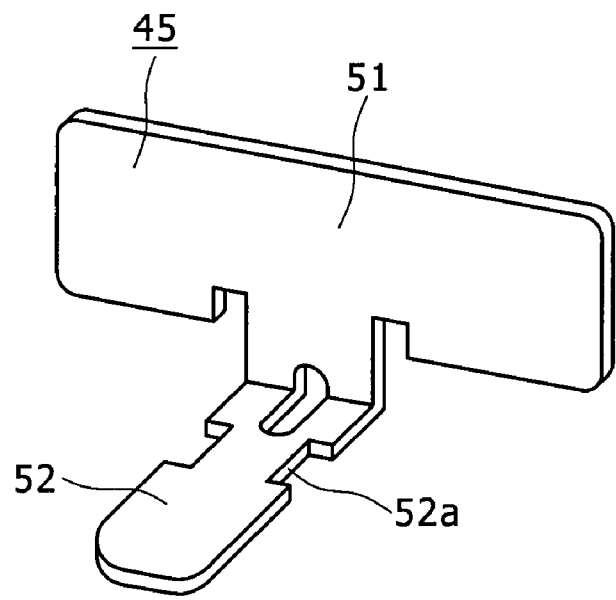
FIGS. 8A and 8B, respectively views of a positive electrode tab
Figure 9:
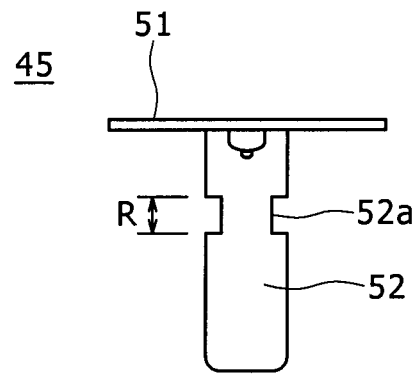
FIG. 9 is a plan view of the positive electrode tab.

With reference to FIG. 8A, the positive electrode tab 45 is formed from a metal thin sheet of, for example, nickel (Ni), into a substantially T shape including a weld portion 51 and a bend tab portion 52. The weld portion 51 is welded to the positive electrode portion 24. The bend tab portion 52 is bent into a substantially L shape from the weld portion 51, and then is welded to the terminal plate 43 by way of the insertion opening 53 of the holder 42. With reference to FIG. 9, the bend tab portion 52 includes a bend portion 52a having a portion narrowed in the width direction, whereby the bend tab portion 52 is bent by being guided by the insertion opening 53 and is bent. The bend portion 52a is formed in a region R that is bent by being guided by the insertion opening 53. With the bend tab portion 52 thus being bent by being guided by the insertion opening 53, the positive electrode tab 45 is bent into a substantially U shape (FIG. 7).

With reference again to FIG. 7, the holder 42 includes a guide portion 54 that guides the bend tab portion 52 of the positive electrode tab 45 to be bent into the insertion opening 53. The guide portion 54 has a substantially arcuate shape along the bending direction of the bend tab portion 52, and the bend portion 52a of the bend tab portion 52 inserted through the insertion opening 53 is disposed in contact therewith. After the bend tab portion 52 is welded to the terminal plate 43 (described further below) and is bent together with the terminal plate 43, the guide portion 54 guides the bend portion 52a to be bent, whereby the bend tab portion 52 is bent 90 degrees.

Figure 8B:
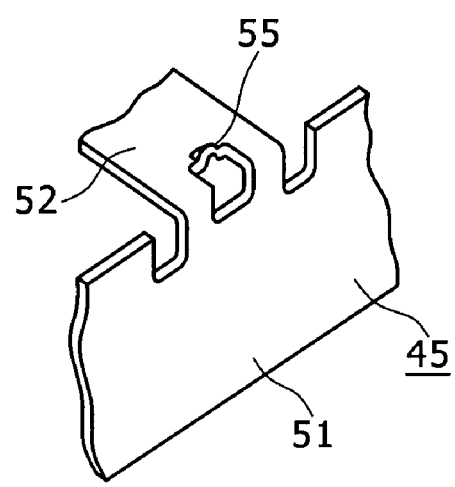

With reference to FIG. 8B, in the positive electrode tab 45, the bend tab portion 52 includes an anchoring protrusion portion 55 that prevents unintended removal from the insertion opening 53. The anchoring protrusion portion 55 includes a punched opening in the bend tab portion 52. A side edge of the punched opening is protrusively formed, such that the surface is gradually raised towards the side of the weld portion 51 from the side of the edge of the bend tab portion 52, and an end face is formed on the side of the weld portion 51. In the positive electrode tab 45, when the bend tab portion 52 is inserted through the insertion opening 53, an end face of the anchoring protrusion portion 55 is anchored by an outer sidewall (serving as a lead-out end) of the insertion opening 53 (see FIG. 7). Thereby, an insertion position into the insertion opening 53 is defined, and the bend portion 52a of the bend tab portion 52 becomes contactable with the guide portion 54 of the insertion opening 53. Further, in the positive electrode tab 45, since the anchoring protrusion portion 55 is anchored to the insertion opening 53, the anchoring protrusion portion 55 is prevented from being unintentionally removed from the insertion opening 53.

The holder 42 further includes a negative electrode opening 56 in a position opposite to the negative portion 25 of the battery cell 2 and a negative electrode anchoring tab 57 on the longitudinally opposite side of the negative electrode opening 56. The negative electrode opening 56 receives insertion of the first negative electrode tab 46, and the negative electrode anchoring tab 57 anchors a second negative electrode tab 47. The first negative electrode tab 46 of the electrode protection member 49 is inserted through the negative electrode opening 56 from the side of the holding portion 50, and is welded to the negative electrode portion 25. Further, the negative electrode anchoring tab 57 anchors the second negative electrode tab 47 of the electrode protection member 49, thereby to support the electrode protection member 49 and to prevent unintended or accidental removal thereof from the holder 42.

Figure 10:
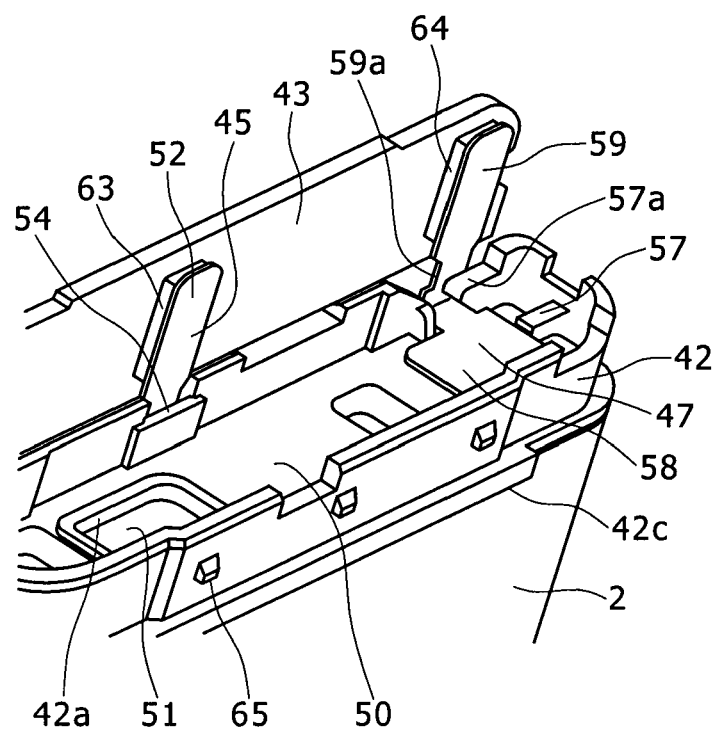
FIG. 10 is a perspective view of a holding portion of a holder.

With reference to FIG. 10, a guide protrusion portion 57a for guiding the second negative electrode tab 47 to be bent is provided in the vicinity of the negative electrode anchoring tab 57. A bend tab portion 59 of the second negative electrode tab 47 is inserted through a lower side of the guide protrusion portion 57a, and the second negative electrode tab 47 is welded to the terminal plate 43. Then, when the second negative electrode tab 47 is bent together with the terminal plate 43 towards the side of the front face of the holder 42, the guide protrusion portion 57a guides the second negative electrode tab 47 and the terminal plate 43 to be bent 90 degrees.

Further, the holder 42 includes, among other things, a valve opening 42b in a position corresponding to the position of the safety valve 26 of the battery cell 2. The holder 42 further includes a contact edge portion 42c projectively formed on upper and lower edges on the reverse face side. The contact edge portion 42c is contacted from the outer side by the protrusions 40 of the battery housing 3.

The electrode protection member 49, which is stored in and supported by the holding portion 50 of the holder 42, includes the PTC component 48, the pair of the PTC component 48 respectively coupled to two ends of the PTC component 48, and an insulating paper 60 for maintaining insulation from the positive electrode tab 45. The PTC component 48 is disposed along the longitudinal direction of the holder 42 and is formed into a rectangular planar shape. The PTC component 48 is interposed between rectangular planar metal sheets that are welded to the first and second negative electrode tabs 46 and 47. The PTC component 48 is coupled to the first and second negative electrode tabs 46 and 47 via the metal sheets.

The first negative electrode tab 46, which is coupled to one end of the PTC component 48, is formed of a metal sheet of, for example, nickel (Ni). The first negative electrode tab 46 is bent to a step-like shape towards the side of the negative portion 25 of the battery cell 2. Thereby, the first negative electrode tab 46 is formed to include a coupling tab portion 46a and a weld tab portion 46b. The coupling tab portion 46a is coupled to one end side of the PTC component 48. The weld tab portion 46b is welded to the negative portion 25 through the negative electrode opening 56.

Figure 11A:
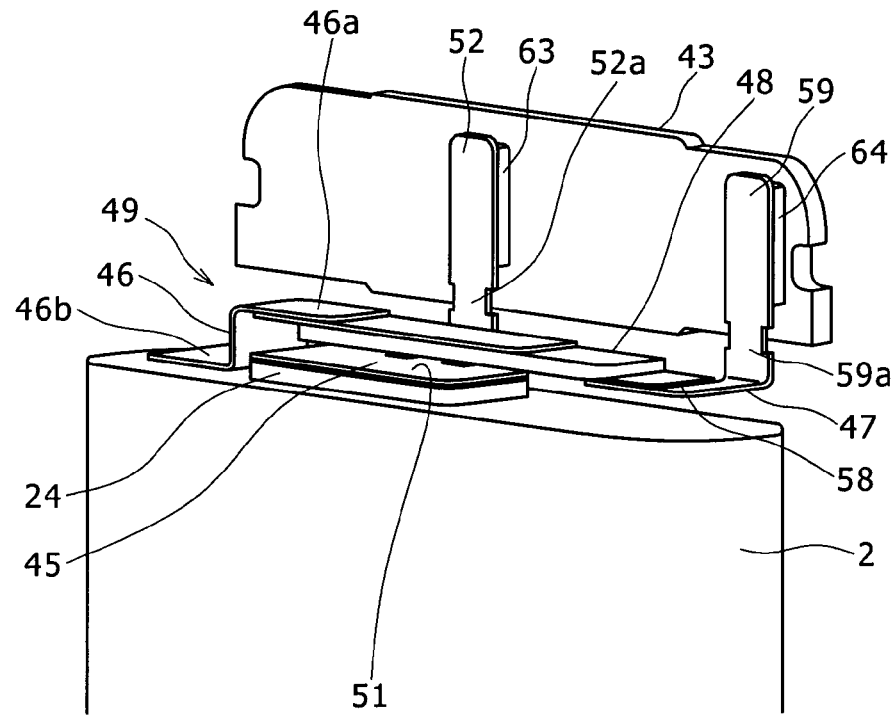
FIGS. 11A and 11B, respectively, are perspective views of the battery cell (in which the holder is not shown) with an electrode protection member attached thereto.
Figure 11B:
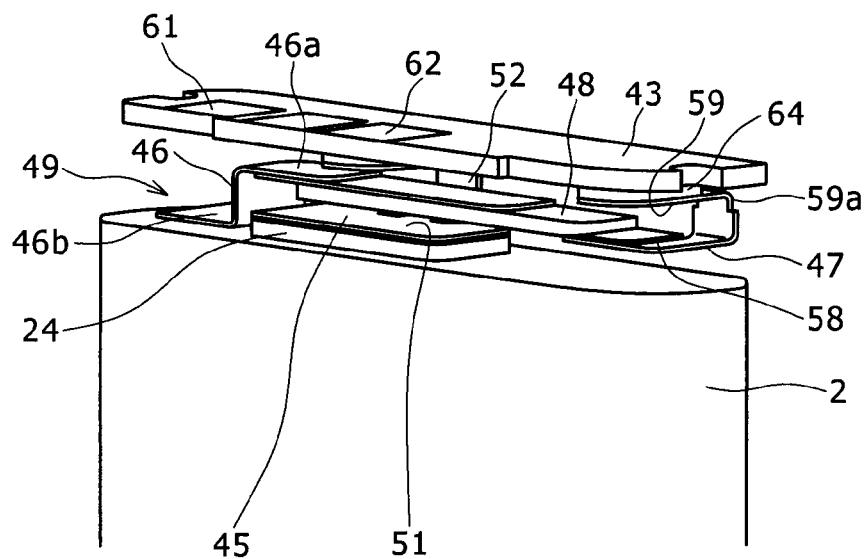

The second negative electrode tab 47, which is coupled to the other end of the PTC component 48, is formed of a metal sheet of, for example, nickel (Ni), into a substantially L shape. Thereby, the second negative electrode tab 47 is formed to include a coupling tab portion 58 and the bend tab portion 59. The coupling tab portion 58 is coupled to the other end side of the PTC component 48. The bend tab portion 59 is bent to a substantially U shape from the coupling tab portion 58 and is coupled to the negative electrode weld plate 64 of the terminal plate 43. The bend tab portion 59 is bent about 90 degrees from the coupling tab portion 58, is pulled out to the side of the front face from the electrode protection member 49 supported to the holder 42, and then is further upwardly bent about 90 degrees (FIG. 11B). Similarly as the positive electrode tab 45, the bend tab portion 59 has a bend portion 59a narrowed in the width direction. The bend portion 59a is guided by the guide protrusion portion 57a of the negative electrode anchoring tab 57 to be bent. With reference to FIG. 10, when the second negative electrode tab 47 is anchored to the negative electrode anchoring tab 57 of the holder 42, the bend portion 59a comes in contact with the guide protrusion portion 57a. Then, the bend tab portion 59 is welded to the negative electrode weld plate 64 of the terminal plate 43, the bend portion 59a is guided by the guide protrusion portion 57a to thereby be bent 90 degrees. In FIG. 10, the first negative electrode tab 46, and the PTC component 48, and the battery housing 3 are not shown to focus on the above-described configuration.

The insulating paper 60 is pasted on the side of front face of the PTC component 48. When the bend tab portion 52 of the positive electrode tab 45 led out to the side of the front face of the electrode protection member 49 is upwardly bent to oppose the electrode protection member 49, the insulating paper 60 maintains insulation from the positive electrode tab 45 and the electrode protection member 49.

The second negative electrode tab 47 is anchored to the negative electrode anchoring tab 57 of the holder 42, and the first negative electrode tab 46 is inserted through the negative electrode opening 56 and is welded to the negative electrode portion 25 from the side of the holding portion 50. Thereby, as shown in FIGS. 11A and 11B, on the side of the front face of the holder 42, the electrode protection member 49 is supported in such a manner as to straddle the positive electrode portion 24 and the positive electrode tab 45 by way of the holder 42. In this case, the weld portion 51 of the positive electrode tab 45 opposes the electrode protection member 49 with a clearance therebetween by way of the holder 42, whereby insulation is maintained therebetween. Further, in this case, the bend tab portion 52 of the positive electrode tab 45 inserted through the insertion opening 53 and the bend tab portion 59 of the second negative electrode tab 47 are led out to the side of the front face of the bend tab portion 59. Thereby, the positive electrode weld plate 63 and negative electrode weld plate 64 of the terminal plate 43 (described further below) become readily weldable (see FIG. 11A). In FIGS. 11A and 11A, the battery housing 3, the holder 42, and the insulating paper 60 are not shown to focus on the above-described configuration.

Thus, in the secondary battery 1, the electrode protection member 49 includes rectangular planar PTC component 48, the pair of negative electrode tabs 46 and 47, and the insulating paper 60. The electrode protection member 49 is disposed in such a manner as to straddle the positive electrode portion 24 and the positive electrode tab 45 by way of the holder 42. Thereby, in the secondary battery 1, while the insulation between the positive and negative electrodes is maintained, the electrode protection member 49 including the negative electrode tabs 46 and 47 and the PTC component 48 on the same side of the front face of the battery cell 2 as the positive electrode portion 24 and the positive electrode tab 45 can be disposed. Consequently, in comparison to a secondary battery in which a protection device, such as PTC component, is directly adhered to a battery cell, in the secondary battery 1, disposition spacing for the protection device need not be secured by sacrificing the battery cell volume. Further, with the rectangular planar PTC component 48 used, the thickness is reduced to thereby enable disposition of components with high space efficiency, whereby a maximum possible volume of the battery cell 2 can be secured in the limited volume of the secondary battery 1, and battery capacity enhancement can be accomplished.

More specifically, FIGS. 12A to 12E, respectively, are explanatory views showing the relationships between PTC component dispositions and the volumes of the battery cell 2 (or, "cell volumes," hereinbelow). FIG. 12A is a battery cell with no adhered PTC component for a reference for measuring the relationship between the PTC component arrangement position and the cell volume.

FIG. 12B shows the secondary battery 1 according to the embodiment of the present invention, in which the positive electrode portion 24 and the positive electrode tab 45 are provided and the PTC component 48 is disposed. In the case of the battery cell 2 shown in FIG. 12B, the cell volume is reduced by 1.8% relative to the reference cell shown in FIG. 12A.

FIG. 12C is a battery cell 2 including the PTC component disposed along the sidewall. In the case of the battery cell 2 shown in FIG. 12C, the cell volume is reduced by 3% relative to the reference cell shown in FIG. 12A.

FIG. 12D is a battery cell 2 including the PTC component disposed on the back surface side. In the case of the battery cell 2 shown in FIG. 12D, the cell volume is reduced by 5% relative to the reference cell shown in FIG. 12A.

FIG. 12E is a battery cell 2 including the PTC component disposed along the upper surface. In the case of the battery cell 2 shown in FIG. 12E, the cell volume is reduced by 9.6% relative to the reference cell shown in FIG. 12A.

As described above, according to the secondary battery 1 according to the present embodiment, the rectangular planar PTC component 48 is used and is disposed in such a manner as to straddle the positive portion 24 and positive electrode tab 45 formed on the side of the front face of the battery cell 2. Consequently, the PTC component 48 can be disposed without substantially reducing the volume of the battery cell 2. In addition, compared to the other battery including the PTC component 48 disposed in the sidewall, back surface, or upper surface, the cell volume can be increased, and hence the battery capacity can be increased.

Further, in the secondary battery 1, the electrode protection member 49, which includes the rectangular planar, lengthy PTC component 48 and the pair of negative electrode tabs 46 and 47, is disposed in such a manner as to straddle the positive electrode portion 24 and the positive electrode tab 45. Thereby, while the thickness of the PTC component 48 is minimized, a resistance value necessary to cut the current in the event of temperature rise can be securely obtained. Consequently, in the case that, for the secondary battery 1, the battery housing 3 and the battery cover 4, respectively, are formed to specified sizes corresponding to the specified size of the battery storage portion 12 to secure compatibility, the lengthy PTC component 48 is used and is disposed along the front side of the battery housing 3, the occupied spacing of the PTC component 48 can be minimized, the volume of the battery cell 2 and the battery capacity can be increased in association with the space saving.

In brief, the secondary battery 1 is assembled in accordance with an assembly process described hereinbelow. The electrode protection member 49 is preliminarily formed in the manner that the pair of negative electrode tabs 46 and 47, respectively, are coupled to two ends of the PTC component 48, and the insulating paper 60 is adhered. Then, the electrode protection member 49 is attached to a holding portion 50 of a holder 42 having open side of the front face from the side of the front face. Then, the second negative electrode tab 47 of the electrode protection member 49 is anchored to the negative electrode anchoring tab 57, and the first negative electrode tab 46 is inserted through the negative electrode opening 56 and then is welded to the negative electrode portion 25. Thereby, the electrode protection member 49 is attached to the holder 42 connected to the battery housing 3. The assembly process of the secondary battery 1 will be described in more detail below.

The following describes the terminal plate 43 coupled to the positive electrode tab 45 held by the holder 42 and to the second negative electrode tab 47 of the electrode protection member 49. The terminal plate 43 includes the positive and negative terminal portions 61 and 62 and a battery protection circuit (not shown). The positive and negative terminal portions 61 and 62 faces outward via the top cover 44 for coupling to electrode terminals disposed in the battery storage portion 12 of the digital still camera 10.

More specifically, with reference to FIG. 4, the terminal plate 43 is configured such that a land is formed on the surface of a rigid baseplate, and gold plating or the like is applied on the land, whereby the positive and negative terminal portions 61 and 62 are formed. With reference to FIG. 11A, on the reverse face of the terminal plate 43, the positive and negative electrode weld plates 63 and 64 are mounted. The positive electrode tab 45 led out from the holder 42 is welded to the positive electrode weld plate 63, and the second negative electrode tab 47 is welded to the negative electrode weld plate 64.

The positive and negative electrode weld plates 63 and 64, respectively, are metal sheets of a conductive material such as nickel, and are electrically connected to the positive and negative terminal portions 61 and 62 by way of circuit patterns formed on the terminal plate 43. The positive and negative terminal portions 61 and 62, respectively, are provided to face outward through terminal openings 68 provided in the top cover 44 for contact with electrode terminals provided to the battery storage portion 12 of the digital still camera 10 or on the side of an electrical charger, for example.

Further, the terminal plate 43 has, in addition to the positive and negative terminal portions 61 and 62, an information terminal portion (not shown) between the positive and negative terminal portions 61 and 62. The information terminal portion serves for sending information, such as battery's residual capacity, to the side of the digital still camera 10.

In the configuration of the terminal plate 43, the positive and negative electrode weld plates 63 and 64 are, respectively, welded to the positive electrode tab 45 and the second negative electrode tab 47 (or "positive and negative electrode tabs 45 and 47," hereinafter) that are led out to the front side of the battery housing 3. The respective bend tab portions 52 and 59 of the positive and negative electrode tabs 45 and 47 are bent, whereby the terminal plate 43 is supported on the front side edge of the holding portion 50 of the holder 42. In this case, the positive and negative terminal portions 61 and 62 and the information terminal portion are positioned toward the side of the front face of the holder 42. Then, the top cover 44 is fitted to the battery housing 3, whereby the terminal plate 43 is interposed between the top cover 44 and the holder 42 and positioning is carried out.

According to the secondary battery 1, while pressure is imposed on the terminal plate 43 when the terminal plate 43 is supported on the front side edge of the holder 42, the pressure can be borne by the holder 42 and the battery housing 3, and the positional precision of the positive and negative terminal portions 61 and 62 can be secured.

The top cover 44, which is attached to the front side of the battery housing 3 and which causes the positive and negative terminal portions 61 and 62 to face outward, will be described in more detail below.

With reference to FIG. 4, the top cover 44 is a substantially trapezoidal planar component molded from a synthetic resin into substantially the same shape as the front side shape of the battery housing 3, in which an edge on the narrow side is arcuate. As such, the top cover 44 is engageable without clearance with the front side of the battery housing 3. The top cover 44 includes a plurality of connection holes 66 intermittently formed on an upper face 44a of its own on the narrow side and on a lower face 44b on the long side of its own. The connection holes 66 permits insertion-through engagement of connection protrusions 65 provided to the holder 42. The top cover 44 further includes, on the upper and lower faces 44a and 44b of its own, the plurality of engagement protrusion portions 67 for engagement with the engagement protrusion portions 41 formed on the front side of the battery housing 3. While being somewhat deflected, the upper and lower faces 44a and 44b are inserted into the battery housing 3 from the front side thereof, whereby the connection protrusions 65 of the holder 42, respectively, are anchored to the connection holes 66, and the engagement protrusion portions 67 are engaged with the engagement protrusion portions 41. In this manner, the terminal plate 43 is attached to the holder 42 and then to the battery housing 3.

The top cover 44 includes, as described above, on its front face, the terminal openings 68 that cause the positive and negative terminal portions 61 and 62 of the terminal plate 43 to face outward. The electrode terminals on the side of, for example, the digital still camera 10 or the electrical charger are brought into contact with the positive and negative terminal portions 61 and 62 through the terminal openings 68. Terminal openings 68 are provided in, for example, three portions depending on positive and negative terminal portions 61 and 62 of the terminal plate 43 to be usable for coupling to positive and negative terminals and an information terminal. However, the number of terminal openings 68 can be appropriately altered (increased or decreased) corresponding to the number of terminal portions provided to the terminal plate 43.

The positive and negative portions 24 and 25 of the battery cell 2 are, respectively, coupled to the positive and negative electrode weld plates 63 and 64 of the terminal plate 43 by way of the positive electrode tab 45 and the holder 42 and the second negative electrode tab 47 of the electrode protection member 49, which are held to the holder 42. Then, the terminal plate 43 is bent to the side of the holder 42. Thereafter, the top cover 44 is attached to the holder 42 and the battery housing 3, thereby to constitute the battery cover 4.

A manufacturing process for the secondary battery 1 will now be described with reference to FIGS. 13A to 13H. In brief, the secondary battery 1 is formed in the manner that the battery housing 3 is fixedly secured or attached to a jig, and a variety of components are assembled thereinto from the front side in the open state.

First, as shown in or in a step of FIG. 13A, the battery housing 3 is attached to a jig (not shown). In this case, the battery housing 3 is attached to the jig so that the front side faces upward. Then, the battery cell 2 is stored in the battery housing 3. In this stage, a strict dimensional accuracy of the cell container 21 is not as yet controlled, such that the battery cell 2 is loosely movable in the battery housing 3 until the exterior film 5 and the model ID film 6 are adhered. For the secondary battery 1, the battery housing 3 and the battery cover 4 are controlled towards required dimensional accuracies to thereby define the overall dimension. Then, the positive and negative terminal portions 61 and 62 are positioned, and contact pressure between the portions and the terminal portions on the side of an electronic device is secured.

In the holder 42, the positive electrode tab 45 is inserted into and held in the insertion opening 53, and the bend tab portion 52 is led out to the front side. The end face of the anchoring protrusion portion 55 is anchored to the outer sidewall of the insertion opening 53 by insertion of the bend tab portion 52 into the insertion opening 53. Thereby, the positive electrode tab 45 is held to the holder 42. Then, as shown in a step of FIG. 13B, the holder 42 with the positive electrode tab 45 inserted therein is attached to the front side of the battery housing 3.

In this case, the contact edge portion 42c contacts the protrusions 40 formed in the side edge portions of the respective main and reverse wall portions 3a and 3b of the battery housing 3 from the outer sides, i.e., the sides of the major and reverse sides 3a and 3b. In the battery housing 3, the main and reverse wall portions 3a and 3b formed with thin thicknesses to secure a large volume of the battery cell 2. As such, when a clearance is formed between the battery cell 2 and the battery housing 3, the front sides of the major and reverse sides 3a and 3b are deformed outward by pressures exerted from the sidewall portions 3c and 3d. However, since the contact edge portion 42c contacts the front sides, thereby making it possible such outward deformation to be prevented.

By mounting of the holder 42 to the battery housing 3, the weld portion 51 is brought into contact with the positive electrode portion 24 of the battery cell 2 by way of the welding opening portion 42a. Then, the positive electrode tab 45 is spot welded thereto from the side of the holding portion 50 by way of the welding opening portion 42*a*, whereby the weld portion 51 is welded to the positive electrode portion 24.

Subsequently, the preliminarily formed electrode protection member 49 is attached from the front side to the holding portion 50 of the holder 42.

With reference to FIG. 13C, the electrode protection member 49 is formed such that the coupling tab portion 46*a* of the first negative electrode tab 46 and a coupling tab portion 47*a* of the second negative electrode tab 47 are, respectively, coupled to two ends of the PTC component 48, and the insulating paper 60 is adhered. The electrode protection member 49 is held to the front side of the holder 42 by anchoring of the second negative electrode tab 47 to the negative electrode anchoring tab 57 of the holder 42. In this case, the first negative electrode tab 46 of the electrode protection member 49 is positioned in contact with the negative portion 25 of the battery cell 2 by way of the negative electrode opening 56.

Subsequently, in a step of FIG. 13D, the weld tab portion 46*b* of the first negative electrode tab 46 is spot welded to the negative electrode portion 25 from the side of the holding portion 50. In this step, the bend tab portion 52 of the positive electrode tab 45 and the bend tab portion 59 of the second negative electrode tab 47 are led out to the front side of the battery housing 3 from the lower face portion of the holder 42. Concurrently, the insulating paper 60 of the electrode protection member 49 is position upwardly of the positive electrode tab 45. Thus, in the secondary battery 1, the electrode protection member 49 including the PTC component 48 is stored in and held to the holding portion 50 of the holder 42 attached to the front face side of the battery cell 2. As such, compared to a case where the PTC component is adhered to, for example, the sidewall, back surface, or bottom face of the battery cell, various advantages can be obtained in the present embodiment case. For example, battery attachment/detachment on the jig can be precluded and assembling is easy, therefore making it possible to implement simplification, efficiency enhancement, and production-yield improvement for the assembly process for the secondary battery 1.

Subsequently, as shown in or in a step of FIG. 13E, in the state where the battery housing 3 is attached to the jig, it is laid down so that the front side faces along the horizontal direction, the respective bend tab portion 52 and bend tab portion 59 of the positive and negative electrode tabs 45 and 47 are, respectively, positioned on the positive and negative electrode weld plates 63 and 64 of the terminal plate 43. Then, in a step of FIG. 13F, spot welding is carried out from portions above the bend tab portions 52 and 59. Thereby, the positive electrode tab 45 and the positive electrode weld plate 63 are welded together, and the second negative electrode tab 47 and the negative electrode weld plate 64 are welded together.

Figure 14:
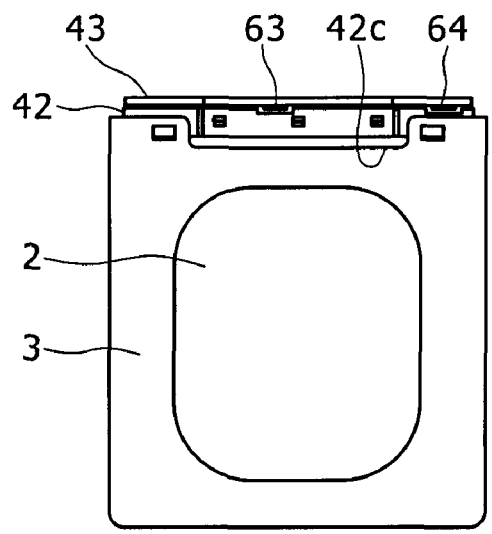
FIG. 14 is a bottom view of a battery housing.

Subsequently, with reference to FIGS. 13G and 14, by bending the respective bend tab portions 52 and 59, the terminal plate 43 is supported to the front face of the holder 42. In this case, the positive electrode tab 45 is guided by the guide portion 54 of the holder 42, whereby the bend portion 52*a* is bent 90 degrees. Further, the second negative electrode tab 47 is guided by the guide protrusion portion 57*a* of the holder 42, the bend portion 59*a* is bent 90 degrees. The terminal plate 43 is positioned in the manner that recess portions formed on the front face of the holder 42 are engaged with the positive and negative electrode weld plates 63 and 64 welded to the respective positive and negative electrode tabs 45 and 47.

Thus, in the manufacture of the secondary battery 1, the first and second negative electrode tabs 46 and 47 are bent while being guided by the guide portion 54 and guide protrusion portion 57*a* of the holder 42. Thereby, the first and second negative electrode tabs 46 and 47 can be accurately manually bent without using a bending jig, therefore making it possible to, for example, the assembling speed and production yield. In the manufacture of the secondary battery 1, the respective bend portions 52*a* and 59*a* are provided to the positive and negative electrode tabs 45 and 47, and are bent while being guided by the guide portion 54 and guide protrusion portion 57*a* of the holder 42. As such, margins need not be provided to the lengths of the respective bend tab portions 52 and 59 of the positive and negative electrode tabs 45 and 47, and the positive and negative electrode tabs 45 and 47 respectively minimized in length can be accurately bent. In addition, the terminal plate 43 can be supported to the holder 42. As such, surplus storage spacings for the respective positive and negative electrode tabs 45 and 47 of the terminal plate 43 need not be secured in the holder 42, so that the battery cover 4 can be miniaturized, and consequently the whole secondary battery 1 can be miniaturization. Further, in the secondary battery 1, the volume of the battery cell 2 can be increased by the volume saved by miniaturization of the battery cover 4, therefore making it possible to increase the battery capacity.

Figure 15:
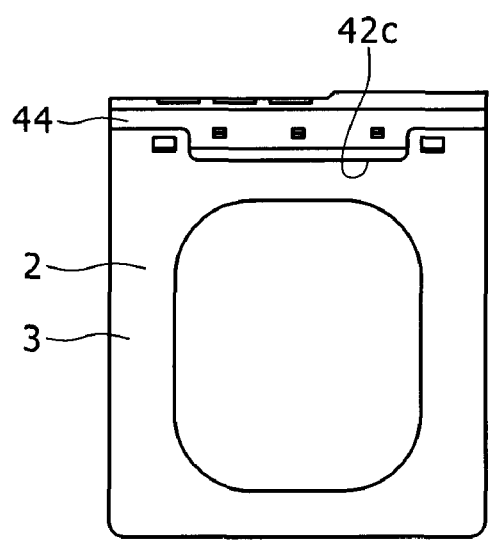
FIG. 15 is a bottom view with a top cover attached thereto.

After the terminal plate 43 has been supported to the holder 42, the battery housing 3 as is attached to the jig is raised to a vertical position so that the front face faces upward, and the top cover 44 is attached to the front face side of the battery housing 3. More specifically, with reference to FIG. 15, the top cover 44 is attached in the manner that the engagement protrusion portions 67 are engaged with the engagement protrusion portions 41 formed on the front face of the battery housing 3, and the connection protrusions 65 of the holder 42 are anchored to the connection holes 66. With the top cover 44 attached to the front face of the battery housing 3, the positive and negative terminal portions 61 and 62 are positioned to face outward through the terminal openings 68.

Finally, with reference to FIG. 13H, the battery housing 3 is detached from the jig, the exterior film 5 is wound on the battery housing 3 from the side of main wall portion 3*a*, and the model ID film 6 is adhered to the reverse wall portion 3*b*. The exterior film 5 and the model ID film 6 are adhered in such a manner as to strand the battery housing 3 and the top cover 44, such that coupling between the battery housing 3 and the battery cover 4 is reinforced thereby. The exterior film 5 and the model ID film 6, respectively, include adhesive layers formed on their backsides. As such, when being wounded on the battery housing 3, the exterior film 5 and the model ID film 6 are adhered also on the major surfaces of the battery cell 2 through the opening portions 36*a* and 36*b* respectively formed on the main and reverse wall portions 3*a* and 3*b*. Thereby, in the secondary battery 1, rattle of the battery cell 2 stored in the battery housing 3 can be prevented.

As described above, the secondary battery 1 is configured such that the battery cell 2, having the positive and negative portions on the front face side of the battery housing 3 is stored in the battery housing 3 having the open front side. Further, the holder 42 holding the positive electrode tab 45 and the electrode protection member 49 and the terminal plate 43 connected to the positive and negative electrode tabs 45 and 47 are disposed on the front side, and the front side is covered by the top cover 44.

As such, in the assembly process for the secondary battery 1, in the state the battery housing 3 is attached to the jig, the battery cell 2, the holder 42, the electrode protection member 49, the terminal plate 43, and the top cover 44 are assembled into the battery housing 3 from the front side thereof. In the assembly process, all the components can be assembled into the battery housing 3 from the front side thereof without detaching the battery housing 3 from the jig. While the battery housing 3 is laid down in the horizontal direction only for welding, jig replacement and the like is not necessary. Thus, the assembly process for the secondary battery 1 can be improved in assembly efficiency and speed.

In the secondary battery 1, the terminal plate 43 is supported by the holder 42, the holder 42 is assembled into the battery housing 3, and the battery housing 3 is covered by the top cover 44. In this configuration, the positional precisions of the positive and negative terminal portions 61 and 62 are secured by setting strict dimensional tolerances for the battery housing 3, the holder 42, and the top cover 44. Consequently, the positional precisions of the positive and negative terminal portions 61 and 62 can be secured regardless of the dimensional accuracy of the battery cell 2. Thereby, the contact pressure for contact with the electrode terminals on the side of the electronic device can be secured, and a predetermined current can be supplied.

In the secondary battery 1, the support walls 39 are formed in the two angular portion 38 on the long-side sides of the battery housing 3, thereby to form the sidewall portions 3c and 3d to be thick, whereby the resistance against the compression forces exerting in the insertion direction of the battery cell 2. As such, according to the secondary battery 1, even in the case the major and reverse sides 3a and 3b are formed to be as thin as possible in order to increase the volume of the battery cell 2, the strength of the battery housing 3 is not reduced. Consequently, according to the secondary battery 1, even when compression forces generated by, for example, the battery-ejection urging member are imposed in the event of insertion and storage into the battery storage portion 12 of the digital still camera 10, the external dimensions can be maintained.

Further, according to the secondary battery 1, the opening portions 36a and 36b of the battery housing 3 can be provided without introducing strength reduction, and consequently, margin for expansion of the battery cell 2 can be obtained.

Further, according to the secondary battery 1, the terminal plate 43 is supported to the front side edge of the holder 42, such that compression forces exerted on the positive and negative terminal portions 61 and 62 and along the insertion direction can be borne by the holder 42 and the battery housing 3 improved in compression force resistance. Consequently, according to the secondary battery 1, even when compression forces are borne by, for example, the urging member or electrode terminals in the battery storage portion 12, the terminal positions of, for example, the positive and negative terminal portions 61 and 62 can be maintained with high precision. Thereby, the secondary battery 1 is enabled to secure contact pressure for contact with the electrode terminals on the side of the electronic device and to supply the predetermined current.

Further, according to the secondary battery 1, the battery cover 4 including the holder 42, which folds the terminal plate 43, and the top cover 44 is attached from the front side of the battery housing 3 along the insertion direction of the battery cell 2. Thereby, even when compression forces are imposed from, for example, the urging member or electrode terminals in the battery storage portion 12 along the insertion direction of the 2, the forces can be borne by for example, the holder 42 and the battery housing 3, thereby making it possible to prevent accidental occurrences of, for example, exterior deformation and damage.

While the embodiment has been described with reference to the example case where the electronic device for using the secondary battery 1 according to the embodiment of the present invention is the digital still camera 10, the electronic device is not limited thereto. The electronic device may be any one of devices other than the digital still camera 10, such as video cameras, cellular phones, PHSs (personal handyphone systems), notebook personal computers, MD players, various other portable devices, and PDA (personal digital assistants).

It should be understood by those skilled in the art that various modifications, combinations, sub-combinations and alterations may occur depending on design requirements and other factors insofar as they are within the scope of the appended claims or the equivalents thereof.

What is claimed is:

1. A battery, comprising:
    a battery cell including two major surfaces, two sidewall surfaces, a front face, and a rear face, and a positive portion and a negative portion to transfer energy from the battery cell are formed on the front face;
    a battery housing including two sidewall portions and an open front side, and the battery housing is configured to store the battery cell therein;
    a battery cover to close the open front side of the battery housing, the battery cover including a positive terminal, a negative terminal, and a holder attached to the front side of the housing;
    a positive electrode tab to connect the positive portion of the battery cell to the positive terminal of the battery cover, and the positive electrode tab is formed into a cross-sectional U shape; and
    a negative electrode tab to connect the negative portion of the battery cell to the negative terminal of the battery cover, and the negative electrode tab passes through a center of the cross-sectional U shape of the positive electrode tab,
    wherein the battery housing includes, on at least one of the two major surfaces, an opening portion formed internally of outer edges of the one major surface along the outer edges to cause the one major surface of the battery cell to face outward, and the two sidewall portions and a back surface side are respectively formed into cross-sectional U shapes and overlap part of the one major surface of the battery cell, and
    wherein the holder includes an opening and a guide portion, the negative electrode tab passes through the opening, and the positive electrode tab contacts the guide portion on a perimeter of the holder.

2. A battery according to claim 1, wherein
    the battery cell includes arcuate portions such that an outer circumference of the battery cell is formed at least in part to be arcuate; and
    the battery housing includes angular portions, respectively, opposing the arcuate portions, and support walls, respectively, including substantially a same curvature as the arcuate portions and supporting the arcuate portions, the support walls being formed along an insertion direction of the battery cell.

3. A battery according to claim 1, wherein
    the battery cell is inserted into the battery housing in a manner that the positive and negative electrode portions of the battery cell are directed to the front side; and
    the holder includes a holding portion that is open in a same direction as an open direction of the front side of the battery housing, wherein the holding portion supports a terminal plate including the positive terminal and the negative terminal that are respectively coupled to the positive and negative portions of the battery cell and that are directed to the front side.

4. A battery according to claim 3, wherein
the battery housing includes a protrusion in a portion for connection to the holder; and
the holder includes an engagement portion for engagement with the protrusion from an outer side.

5. A battery according to claim 2, wherein the battery cell includes a cross-sectional elliptic shape and includes the arcuate portions respectively formed on the sidewall portions; and
the battery housing includes a cross-sectional substantially trapezoidal shape, wherein the angular portions, respectively, are formed at both ends of one long side of the trapezoidal shape, and arcuate walls supporting the arcuate portions, respectively, are formed at both ends of the other long side.

6. A battery according to claim 1, further comprising:
an insulating paper positioned between the negative electrode tab and the positive electrode tab to insulate the negative electrode tab from the positive electrode tab.

7. A battery according to claim 3, wherein
the battery cover includes a terminal plate attached to the front side of the housing at a position outside of the holder, the holder including the opening and the guide portion;
the negative electrode tab passes through the opening to attach to a negative electrode weld plate positioned on the terminal plate; and
the positive electrode tab contacts the guide portion on the perimeter of the holder to attach to a positive electrode weld plate positioned on the terminal plate.

* * * * *